(12) United States Patent
Teipen et al.

(10) Patent No.: US 10,267,700 B2
(45) Date of Patent: Apr. 23, 2019

(54) CAPACITIVE PRESSURE SENSOR AND METHOD FOR ITS PRODUCTION

(71) Applicant: Endress + Hauser GmbH + Co. KG, Maulburg (DE)

(72) Inventors: Rafael Teipen, Berlin (DE); Benjamin Lemke, Berlin (DE); Timo Kober, Potsdam (DE); Lars Karweck, Binzen (DE); Stefan Rummele-Werner, Lorrach (DE); Thomas Zieringer, Schopfheim (DE)

(73) Assignee: ENDRESS+HAUSER SE+CO.KG, Maulburg (DE)

( * ) Notice: Subject to any disclaimer, the term of this patent is extended or adjusted under 35 U.S.C. 154(b) by 37 days.

(21) Appl. No.: 15/523,457

(22) PCT Filed: Sep. 2, 2015

(86) PCT No.: PCT/EP2015/070031
§ 371 (c)(1),
(2) Date: May 1, 2017

(87) PCT Pub. No.: WO2016/066306
PCT Pub. Date: May 6, 2016

(65) Prior Publication Data
US 2017/0315008 A1    Nov. 2, 2017

(30) Foreign Application Priority Data

Oct. 30, 2014    (DE) .................. 10 2014 115 802

(51) Int. Cl.
*G01L 9/00* (2006.01)
*G01L 9/12* (2006.01)
(Continued)

(52) U.S. Cl.
CPC .............. *G01L 9/0073* (2013.01); *G01L 9/12* (2013.01); *G01L 13/025* (2013.01); *G01L 19/04* (2013.01); *G01L 19/069* (2013.01)

(58) Field of Classification Search
CPC ....... G01L 9/0073; G01L 9/12; G01L 13/025; G01L 19/04; G01L 19/069
See application file for complete search history.

(56) References Cited

U.S. PATENT DOCUMENTS

| 5,001,595 | A | 3/1991 | Dittrich |
| 5,561,247 | A | 10/1996 | Mutoh |

(Continued)

FOREIGN PATENT DOCUMENTS

| CN | 1010879999 A | 12/2007 |
| DE | 10100321 A1 | 7/2001 |

(Continued)

OTHER PUBLICATIONS

German Search Report, German Patent Office, Munich, DE, dated Nov. 18, 2014.

(Continued)

*Primary Examiner* — Ryan D Walsh
(74) *Attorney, Agent, or Firm* — Bacon & Thomas, PLLC (57) ABSTRACT

A high-precision pressure sensor, having a first base body that has two electrically conductive layers and an insulation layer arranged between the two layers and electrically insulating the two layers from one another, an electrically conductive measurement membrane arranged on the first base body with inclusion of a pressure chamber, which measurement membrane can be charged with a pressure to be measured, and an electrode provided in the membrane-facing layer and spaced apart from the measurement membrane, which electrode together with the measurement membrane forms a capacitor having a capacitance that varies (Continued)

according to the pressure acting upon the measurement membrane. The first base body is characterized in that it has a measurement membrane terminal via which a reference potential can be applied to the measurement membrane, an electrode terminal via which an electrode potential of the electrode can be tapped, and a shield terminal via which a shield potential that can be predetermined independently of the reference potential especially, a shield potential corresponding to the electrode potential can be applied to the layer facing away from the membrane.

10 Claims, 5 Drawing Sheets

(51) Int. Cl.
    *G01L 13/02*     (2006.01)
    *G01L 19/04*     (2006.01)
    *G01L 19/06*     (2006.01)

(56) References Cited

U.S. PATENT DOCUMENTS

| | | |
|---|---|---|
| 6,505,516 B1 | 1/2003 | Frick |
| 7,685,879 B2 | 3/2010 | Kang |
| 2008/0073760 A1* | 3/2008 | McNeil ................ G01L 9/0073 257/669 |
| 2009/0322353 A1 | 12/2009 | Ungaretti |
| 2011/0108932 A1 | 5/2011 | Benzel |
| 2017/0315008 A1 | 11/2017 | Teipen |

FOREIGN PATENT DOCUMENTS

| | | |
|---|---|---|
| DE | 10313908 B3 | 11/2004 |
| DE | 102004061796 A1 | 7/2006 |
| DE | 112004002995 B4 | 12/2010 |
| DE | 10393943 B3 | 6/2012 |
| DE | 102014115802 A1 | 5/2016 |
| EP | 1988366 A1 | 11/2008 |
| WO | 2004057291 A1 | 7/2004 |

OTHER PUBLICATIONS

International Search Report, EPO, The Netherlands, dated Jan. 19, 2016.

English Translation of the International Preliminary Report on Patentability, WIPO, Geneva, CH, dated May 11, 2017.

First Office Action issued by Chinese Patent Office on Jan. 3, 2019.

* cited by examiner

CAPACITIVE PRESSURE SENSOR AND METHOD FOR ITS PRODUCTION

TECHNICAL FIELD

The present invention relates to a capacitive pressure sensor having a first base body that has two electrically conductive layers and an insulation layer arranged between the two layers, the insulation layer electrically insulating the two layers from one another; an electrically conductive measurement membrane that is arranged on the first base body with inclusion of a pressure chamber, which measurement membrane can be charged with a pressure to be measured; and an electrode provided in the layer facing toward the membrane and spaced apart from the measurement membrane, the electrode—together with the measurement membrane—forming a capacitor having a capacitance that varies as a function of the pressure acting upon the measurement membrane; as well as a method for its production.

BACKGROUND DISCUSSION

Capacitive pressure sensors are used in industrial metrology to measure pressures. For example, pressure sensors designated as semiconductor sensors or sensor chips, which may be produced cost-effectively in a wafer structure using processes known from semiconductor technology, are used as pressure sensors. Pressure sensors designed as absolute or relative pressure sensors normally have a measurement membrane applied onto a base body with the inclusion of a pressure chamber, the outside of which measurement membrane is charged with a pressure to be measured in a measurement operation. Absolute pressure sensors measure the pressure acting upon the measurement membrane relative to a vacuum prevailing in the pressure chamber. Relative pressure sensors measure the pressure relative to a reference pressure supplied to the pressure chamber, e.g., the current atmospheric pressure.

Pressure sensors designed as differential pressure sensors normally have two base bodies, between which the measurement membrane is arranged. In these sensors, a pressure chamber included under the measurement membrane is also respectively provided in each of the two base bodies. In measurement operation, the first side of the measurement membrane is charged with the first pressure via a recess in the first base body, and the second side of the measurement membrane is charged with the second pressure via a recess in the second base body.

Capacitive pressure sensors comprise at least one capacitive, electromechanical transducer that detects a deflection of the measurement membrane dependent upon the pressure acting upon the measurement membrane, and that transduces the deflection into an electrical signal reflecting the pressure to be measured. Semiconductor sensors normally have a conductive measurement membrane that, together with an electrode integrated into the base body and electrically insulated from the measurement membrane, forms a capacitor having a capacitance dependent upon the pressure to be measured.

A differential pressure sensor designed as a capacitive differential pressure sensor is described in German patent, DE 103 93 943 B3. This comprises a measurement membrane mounted between a first and a second base body, the measurement membrane being connected so as to be pressure-sealed with each of the base bodies, with respective inclusion of a pressure chamber, the first side of the measurement membrane being able to be charged with a first pressure via a recess in the first base body, and the second side of the measurement membrane being able to be charged with the second pressure via a recess in the second base body. The base bodies respectively comprise an electrically conductive layer facing away from the membrane and an electrically conductive layer facing toward the membrane, and an insulation layer arranged between the two layers and insulating both layers from one another. Provided in the layer of the base body that faces toward the membrane is a respective electrode spaced apart from the measurement membrane, which electrode, together with the measurement membrane, forms a capacitor having a capacitance that varies as a function of the pressure acting upon the measurement membrane. For this, the electrodes are electrically insulated via a trench from an outer edge region of the respective membrane-facing layer, said edge region being connected with the measurement membrane.

In principle, the pressure difference may be determined using each of the two measured capacitances C1, C2. However, the pressure difference determination preferably takes place using, not the individually measured capacitances, but rather a differential change f in the two capacitances C1, C2. For example, the differential change f may be determined as a product of a constant k and a difference in the reciprocal values of the capacitances C1, C2, according to: $f=k(1/C1-1/C2)$, and exhibits a linear dependency upon the pressure difference to be measured.

With capacitive pressure sensors, a problem exists that a respective capacitive coupling exists, not only between the region of the measurement membrane that deforms according to pressure and the electrodes situated opposite this, but also between the electrodes and their surroundings and between the measurement membrane and its surroundings. Accordingly, in addition to the capacitance that varies according to pressure, a capacitance measured between the measurement membrane and one of the electrodes also includes parasitic capacitances due to the capacitive couplings relative to the environment. The greater the parasitic capacitances in comparison to the capacitance changes of the pressure-dependent capacitance, the changes being dependent upon the pressure-dependent deflection of the measurement membrane that is to be metrologically detected, the smaller the measurement effect, and, therefore, also the smaller the achievable measurement precision.

Moreover, parasitic capacitances lead to nonlinear effects that hinder the determination of the pressure to be measured using the measured capacitances. In particular, parasitic capacitances in differential pressure sensors produce nonlinear dependencies of the differential change f on the pressure difference that is to be measured, the dependencies being dependent upon the size of the differential pressure sensors. Moreover, non-reproducible changes in parasitic capacitances may lead to a falsification of the capacitance measurement signals.

To reduce the negative influences of parasitic capacitances, DE 103 93 943 B3 describes establishing contact between the electrodes integrated into the base bodies respectively through the layer facing away from the membrane and the insulation layer of the respective base body, and shielding the electrodes from the environment of the differential pressure sensor, in that a reference potential is applied to the measurement membrane, the edge regions of the membrane-facing layers, and the layers facing away from the membrane, via an electrically conductive coating applied onto the outside of the differential pressure sensor. For this, the coating is preferably grounded. Alternatively, an electrical circuit connected to the aforementioned modules is described that keeps all of these modules at a ground potential or a reference potential of the connected circuit. However, coating the outsides of pressure sensors produced in a wafer structure is only possible subsequently, after the individualization of the pressure sensors. The coating of every single pressure sensor is complicated and, in comparison to processes that can be cost-effectively executed on the wafer structure, less precise.

Given that the cited components are set to the same electrical potential, a shielding of the pressure sensor relative to the environment of the pressure sensor, similar to that with a Faraday cage, is produced, and the potential relationships in the immediate environment of the electrode inside the pressure sensor are kept stable. However, that inevitably has the consequence that the electrodes and their connection lines running across the respective base body are at an electrode potential, varying over time as a function of the pressure to be measured, that differs from the potential of the modules surrounding it and varies relative to these. Due to the capacitive couplings existing between the electrodes and their connection lines relative to the modules surrounding these within the differential pressure sensor, any variation in the electrode potential produces charge shifts in the immediate environment of the electrodes and their connection lines that immediately retroact upon a measurement signal tapped via the electrode terminals. They thus lead to a falsification of the measurement signal and, therefore, negatively affect the measurement precision.

SUMMARY OF THE INVENTION

It is an object of the present invention to specify a high-precision pressure sensor, as well as a method for its production.

According to the invention, the object is achieved by a pressure sensor having:
- a first base body,
  that has two electrically conductive layers and an insulation layer arranged between the two layers and electrically insulating the two layers from one another,
- an electrically conductive measurement membrane that is arranged on the first base body with inclusion of a pressure chamber and that can be charged with a pressure to be measured, and
- an electrode provided in the membrane-facing layer and spaced apart from the measurement membrane, which electrode—together with the measurement membrane—forms a capacitor having a capacitance that is varies as a function of the pressure acting upon the measurement membrane, that is characterized in that the pressure sensor
- has a measurement membrane terminal via which a reference potential can be applied to the measurement membrane,
- has an electrode terminal via which an electrode potential of the electrode can be tapped, and
- a shield terminal via which a shield potential that can be predetermined independently of the reference potential—especially, a shield potential corresponding to the electrode potential—can be applied to the layer facing away from the membrane.

A development is characterized in that a circuit (especially, a circuit having a buffer amplifier—especially, an impedance converter) connected at the input side to an electrode terminal and at the output side to the shield terminal is provided, which circuit, in measurement operation,
- taps the electrode potential via the electrode terminal connected to it at the input side,
- generates a shield potential corresponding to the tapped electrode potential, and
- applies the shield potential to the shield terminal connected to it at the output side.

According to a preferred embodiment, the reference potential is ground or a reference potential of a circuit connected to the electrode terminal—especially, to the electrode terminal and the shield terminal.

A first variant is characterized in that
- the membrane-facing layer has an outer edge region connected with the measurement membrane and electrically insulated from the electrode,
- an additional insulation layer that electrically insulates the edge region from the measurement membrane is provided between the edge region and the measurement membrane, and
- the edge region is connected with the shield terminal via an electrically conductive connection.

A second variant is characterized in that
- the membrane-facing layer has an outer edge region connected with the measurement membrane and electrically insulated from the electrode, and
- the edge region is connected with the membrane terminal via an electrically conductive connection.

A preferred development is characterized in that
- the membrane terminal comprises a membrane terminal line that extends along a generated surface of a recess provided in the first base body—especially, of a recess provided at an edge of the first base body—from a face side of the layer facing away from the membrane (the face side facing away from the membrane) up to the measurement membrane, the membrane terminal line being in electrically conductive connection with the measurement membrane, and
- the shield terminal has a shield terminal line,—especially a shield terminal line extending across a generated surface of a recess provided first in the base body the shield terminal line being in electrically conductive connection with the layer facing away from the membrane.

A further development is characterized in that
- the membrane-facing layer has an outer edge region connected with the measurement membrane and electrically insulated from the electrode, and
- the electrode terminal comprises an electrode terminal line that extends, along a generated surface of a recess provided in the first base body, from a face side of the layer facing away from the membrane (the face side facing away from the membrane) up to the electrode, the electrode terminal line being electrically insulated from the layer facing away from the membrane by an insulation layer arranged between the electrode terminal line and the layer facing away from the membrane.

A development of the first variant is characterized in that
- the first base body has a first recess extending through the layer facing away from the membrane and the insulation layer arranged between the layer facing away from the membrane and the membrane-facing layer, up to the edge region of the membrane-facing layer, and
- the shield terminal comprises a shield line that travels along a generated surface of the first recess and, there, is in electrically conductive connection with the layer facing away from the membrane and the edge region of the membrane-facing layer, the first base body has a second recess extending through the layer facing away from the membrane, the insulation layer, the edge region of the membrane-facing layer, and the additional insulation layer, up to the measurement membrane, the membrane terminal comprises a membrane terminal line, that travels to the measurement membrane along a generated surface of the second recess, through the layer facing away from the membrane, the insulation layer, and the edge region of the membrane-facing layer, that is electrically insulated, via an insulation layer arranged between the membrane terminal line and the generated surface, from the layer facing away from the membrane and the edge region of the membrane-facing layer, and that is in electrically conductive contact with a region of the measurement membrane that is accessible through the recess.

A development of the second variant is characterized in that the shield terminal comprises a shield line that extends across a generated surface of the layer facing away from the membrane, wherein the generated surface comprises, in particular, a generated surface of a first recess provided in the first base body, which surface leads from a face side facing away from the membrane into the first base body and, at maximum, extends up to the insulation layer, the edge region is connected with the measurement membrane, electrically insulated from the measurement membrane via an additional insulation layer, the first base body has a second recess extending from the face side of the first base body (the face side facing away from the membrane), through the layer facing away from the membrane, the insulation layer, the edge region of the membrane-facing layer, and the additional insulation layer, up to the measurement membrane, and the membrane terminal comprises a membrane terminal line, that travels to the measurement membrane along a generated surface of the second recess, through the layer facing away from the membrane, the insulation layer, and the edge region of the membrane-facing layer, that is electrically insulated, via an insulation layer arranged between the membrane terminal line and the generated surface, from the layer facing away from the membrane, and that is in electrically conductive contact with the edge region of the membrane-facing layer and with a region of the measurement membrane that is accessible through the recess.

The invention additionally encompasses a pressure sensor according to the invention, said pressure sensor being characterized in that a second base body, connected with the measurement membrane with inclusion of a pressure chamber, is provided on a side of the measurement membrane opposite the first base body, a first side measurement membrane can be charged with a first pressure via a recess in the first base body that opens into the pressure chamber of the first base body, and a second side of the measurement membrane can be charged with a second pressure via a recess in the second base body that opens into the pressure chamber of the second base body, and the second base body has two electrically conductive layers and an insulation layer arranged between its two layers, insulating the two layers from one another, has an electrode provided in the membrane-facing layer and spaced apart from the measurement membrane, which electrode—together with the measurement membrane—forms a capacitor having a capacitance that varies as a function of the pressure acting upon the measurement membrane, has an electrode terminal via which an electrode potential at which its electrode lies can be tapped, and has a shield terminal via which a shield potential—especially, a shield potential corresponding to the electrode potential of its electrode—can be applied to the layer facing away from the membrane.

A development of the last cited variant is characterized in that the membrane-facing layer of the second base body has an outer edge region connected with the measurement membrane and electrically insulated from the electrode, that is electrically insulated from the measurement membrane, and is connected with the shield terminal of the second base body via an electrically conductive connection, or that is connected, via an electrically conductive connection, with a membrane terminal traveling across the second base body.

The invention additionally encompasses a method for operation of a pressure sensor according to the invention, characterized in that the measurement membrane is charged with a pressure to be measured, capacitances dependent upon the pressure acting upon the measurement membrane are measured by at least one capacitor formed by an electrode (provided in one of the base bodies) and the measurement membrane, during the measurement of the respective capacitance, a reference potential is applied to the measurement membrane—especially, ground, or a reference potential of a circuit connected to the pressure sensor—especially, of a circuit comprising a capacitance measurement circuit—and during the measurement of the respective capacitance, a shield potential is applied to the layer of the base body (the layer facing away from the membrane) comprising the electrode (17) of this capacitor, which shield potential corresponds to the electrode potential of the electrode of this capacitor.

The invention additionally encompasses a method for producing pressure sensors or differential pressure sensors according to the preferred development, which method is characterized in that the production takes place in a wafer structure, the base bodies are produced from a wafer—especially, an SOI wafer—having a conductive substrate layer, an insulation layer arranged thereon, and a conductive cover layer arranged on its insulation layer, wherein the layers of the base bodies that face away from the membrane are generated from the substrate layer, the insulation layers of the base bodies are generated from the insulation layer of the wafer, and the membrane-facing layers are generated from the cover layer of the wafer, the recesses to be provided in the base bodies are generated by reliefs generated in the corresponding layers of the wafer—especially, reliefs generated by etching processes, in the production of base bodies having a membrane terminal, insulation layers are applied between the membrane terminal lines and the layers facing away from the membrane, or between the membrane terminal line and the layers facing away from and toward the membrane, the insulation layers especially being applied via oxidation processes, and the shield lines and, in the production of base bodies having a membrane terminal, also the membrane terminal lines are applied (especially, sputtered) as metallic coatings.

A development of this method for production of differential pressure sensors is characterized in that first and second base bodies are generated in the wafer structure via the corresponding method, additional insulation layers are generated on the membrane-facing layers of the first and second base bodies, which insulation layers in the finished pressure sensors produce an insulation of an outer edge region of the membrane-facing layers (the outer edge region being connected with the measurement membrane) from the respective measurement membrane, the first base bodies provided with the additional insulation layers are connected in the wafer structure with a second wafer having a conductive cover layer—especially, via direct silicon bonding (silicon fusion bonding)—such that the cover layer of the second wafer rests upon the insulation layers, the second wafer is removed except for its cover layer forming the measurement membranes, and the second base bodies provided with the additional insulation layers are connected in the wafer structure with the cover layer forming the measurement membranes—especially, via direct silicon bonding (silicon fusion bonding)—such that the insulation layers applied on the first and second base bodies are oppositely situated.

BRIEF DESCRIPTION OF THE DRAWINGS

The invention and its advantages will now be explained in detail using the figures in the drawing, which show two exemplary embodiments. The same elements are indicated by the same reference numbers in the figures.

DETAILED DISCUSSION IN CONJUNCTION WITH THE DRAWINGS

Figure 1:
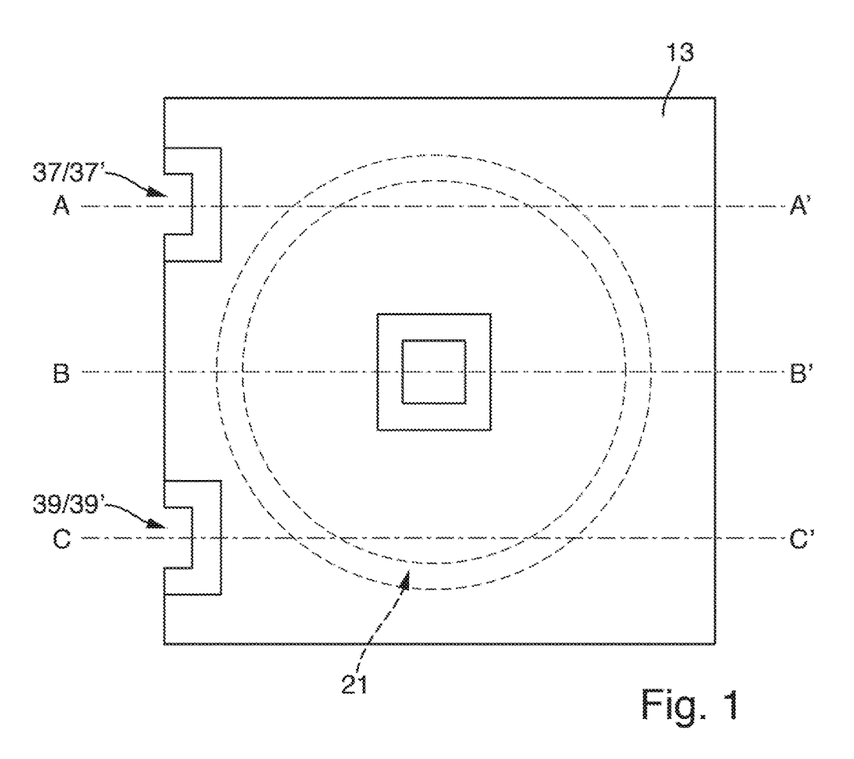
FIG. 1 shows a plan view of a pressure sensor according to the invention.
Figure 2:
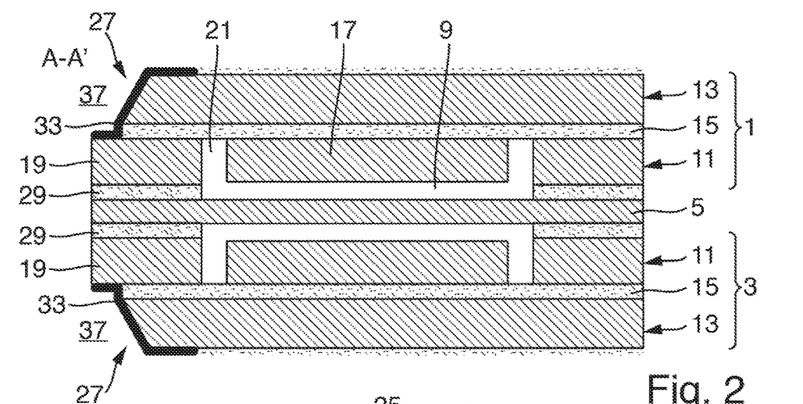
FIGS. 2-4 show sectional drawings of the pressure sensor from FIG. 1.
Figure 3:
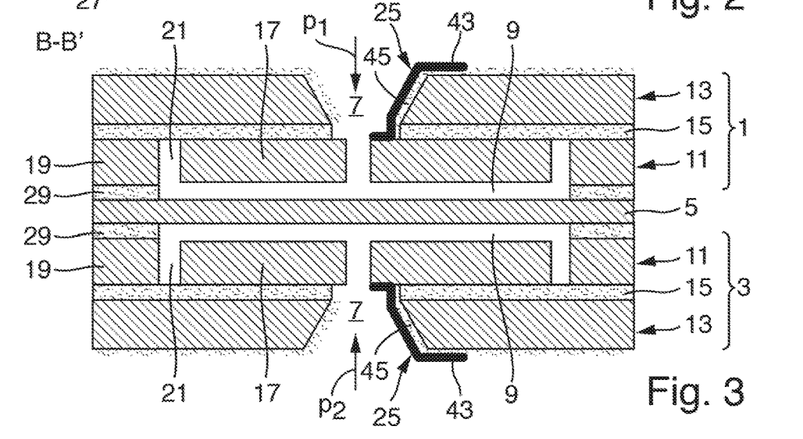
Figure 4:
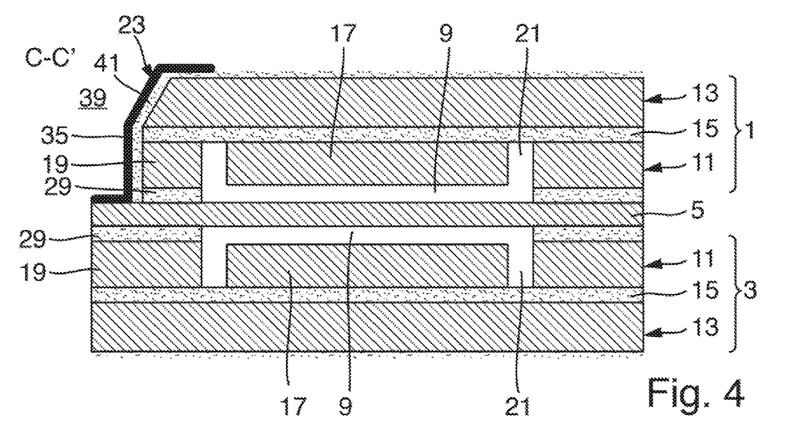

FIG. 1 shows a plan view of a pressure sensor—designed here as a differential pressure sensor—according to the invention. FIGS. 2-4 show sectional drawings of this pressure sensor along the section planes A-A', B-B', C-C' drawn in FIG. 1.

The pressure sensor comprises a pressure-sensitive, electrically conductive measurement membrane 5 arranged between a first and a second base body 1, 3, the first side of which measurement membrane 5 can be charged with a first pressure $p_1$ via a recess 7 in the first base body 1, and the second side of which measurement membrane 5 can be charged with a second pressure $p_2$ via a recess 7 in the second base body 3. For this, provided in each of the two base bodies 1, 3 is a pressure chamber 9 enclosed below the measurement membrane 5, to which pressure chamber 9 the first or second pressure $p_1$, $p_2$ can be supplied via the recess 7 in the respective base body 1, 3.

The first base body 1 comprises two electrically conductive layers 11, 13 between which is arranged an insulation layer 15 electrically insulating the two layers 11, 13 from one another. The membrane-facing layer 11 comprises an inner electrode 17 spaced apart from the measurement membrane 5, which electrode 17 is surrounded by an outer edge region 19 of the membrane-facing layer 11 that is connected with an outer edge of the measurement membrane 5. Electrode 17 and edge region 19 are electrically insulated from one another by a trench 21 provided in the membrane-facing layer 11 and leading up to the insulation layer 15. The position of the trench 21 is indicated by dashed lines in the plan view of FIG. 1.

The second base body 3 also preferably has two electrically conductive layers 11, 13 that are insulated from one another by an insulation layer 15 arranged between the two layers 11, 13. Furthermore, also provided in the second base body 3 is preferably at least one inner electrode 17 spaced apart from the measurement membrane 5, which electrode 17 is preferably likewise formed by an inner region of the membrane-facing layer 11 that is electrically insulated by a trench 21 from an outer edge region 19 of the membrane-facing layer 11, said outer edge region 19 being connected with an outer edge of the measurement membrane 5.

Each of the two electrodes 17, together with the conductive measurement membrane 5, forms a capacitor having a capacitance that varies as a function of a pressure difference $\Delta p$ acting upon the measurement membrane 5.

According to the invention, the pressure sensor has a membrane terminal 23 that is connected with the measurement membrane 5 so as to be electrically conductive, and each base body 1, 3 having an electrode 17 has an electrode terminal 25 connected with the respective electrode so as to be electrically conductive and a shield terminal 27 connected with the layer 13 of the respective base body 1, 3, the layer 13 facing away from the membrane, so as to be electrically conductive. The variable electrode potentials E1, E2 at which the electrodes 17 lie can be tapped via the electrode terminals 25. Moreover, the transfer of a measurement signal respectively also takes place via the electrode terminals 25, using which measurement signal the pressure-dependent capacitance C1, C2 of the capacitor formed by the respective electrode 17 and the measurement membrane 5 is determined. In contrast to this, the membrane terminal 23 serves to apply a reference potential $U_0$ to the measurement membrane 5. The reference potential $U_0$ is preferably a stable, pre-determinable potential that is optimally invariant over time, e.g., ground ora reference potential of a circuit connected to the pressure sensor. The shield terminals 27 serve to apply a shield potential $U_{E1}$, $U_{E2}$ to the layer 13 of the respective base body 1, 3, the layer 13 facing away from the membrane. The shield potentials $U_{E1}$, $U_{E2}$ thus may be provided independently of the reference potential $U_0$ applied to the measurement membrane 5. In measurement operation, a shield potential $U_{E1}$, $U_{E2}$ is applied to the layer 13 of each base body 1, 3 equipped with an electrode 15 (the layer 13 facing away from the membrane), which shield potential $U_{E1}$, $U_{E2}$ corresponds to the electrode potential E1, E2 of the electrode 17 that is provided in the respective base body 1, 3 that is tapped via the electrode terminal 25 of the respective base body 1, 3.

The respective shield potential $U_{E1}$, $U_{E2}$ is applied, not only to the layer 13 facing away from the membrane, but also, in parallel to this, to the edge region 19 of the respective base body 1, 3 that surrounds the respective electrode 17. In the exemplary embodiment depicted in FIGS. 2-4, this is produced in that a respective insulation layer 29 is provided between the edge regions 19 and the measurement membrane 5, and the shield terminals 27 that are connected in an electrically conductive manner with the layers 13 facing away from the membrane are directed across the respective layer 13 facing away from the membrane, through the additional insulation layer 29, up to the edge regions 19 of the respective base body 1, 3, where they are connected in an electrically conductive manner with the respective edge region 19. Alternatively, the outer edge regions 19 may respectively contact via separate shield terminals that are connected therewith in an electrically conductive manner, and are kept at the shield potential $U_{E1}$, $U_{E2}$ corresponding to the respective electrode potential E1, E2.

Via the application of the shield potential $U_{E1}$, $U_{E2}$ corresponding to the respective electrode potential E1, E2 to the layers 13 facing away from the membrane, it is achieved that, during the measurement, the layer 13 facing away from the membrane is at the same potential as the electrode 17 and its electrode terminal 25. In each of the base bodies 1, 3, the parasitic capacitances between its electrode 17 and its layer 13 facing away from the membrane, as well as between its electrode terminal 25 and its layer 13 facing away from the membrane, are thereby shorted. Naturally, this also accordingly applies with regard to the edge regions 19, insofar as these are likewise held at the respective shield potential $U_{E1}$, $U_{E2}$ via the shield terminals 27.

Figure 5:
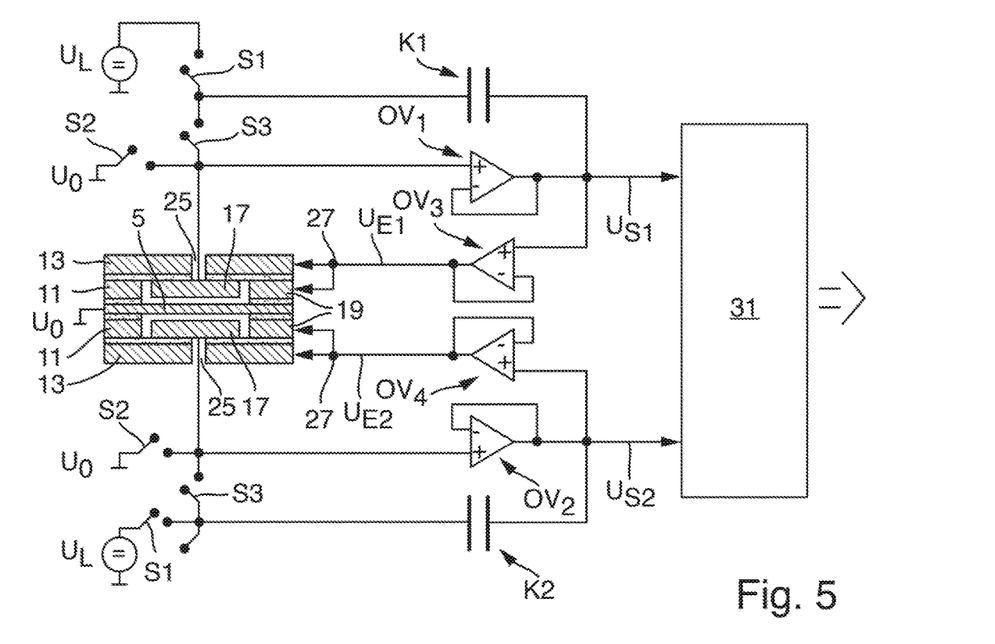
FIG. 5 shows a schematic sketch of a pressure sensor according to the invention and a circuit connected thereto.

FIG. 5 shows a schematic sketch of the pressure sensor of FIGS. 1 through 4 in conjunction with a block diagram of a circuit connected to the terminals of the pressure sensor. For each base body 1, 3 having an electrode 17, the circuit respectively comprises a capacitance measurement circuit and a circuit that generates the shield potential $U_{E1}$, $U_{E2}$ corresponding to the respective electrode potential E1, E2. A capacitance measurement circuit operating according to the principle of charge transfer—for example, as it is described in German patent, DE 101 34 680 A1—is preferably used as a capacitance measurement circuit. Such capacitance measurement circuits respectively comprise a first buffer amplifier OV1, OV2—especially, an impedance converter—that is connected at the input side to an electrode terminal 25 of the respective electrode 17, and at the output side supplies a clocked and cyclically updated signal voltage $U_{S1}$, $U_{S2}$ corresponding to the electrode potential E1, E2 of the respective electrode 17. Moreover, they respectively have a reference capacitor K1, K2 of known capacitance $C_{ref1}$, $C_{ref2}$ whose first side is connected with a voltage source via a first switch S1, which voltage source generates a charge voltage $U_L$ that is preferably relative to the reference potential $U_0$ present at the measurement membrane 5. The second side of the respective reference capacitor K1, K2 is connected with the output of the first buffer amplifier OV1, OV2; the signal voltage $U_{S1}$, $U_{S2}$ corresponding to the respective electrode potential E1, E2 is thus constantly applied. The electrode terminals 25 are respectively connected to the reference potential $U_0$ via a second switch S2, and via a third switch S3 with a connection point arranged between the first switch S1 and the first side of the respective reference capacitor K1, K2, which connection point is connected with the first side of the respective reference capacitor K1, K2. The capacitance measurement takes place in measurement cycles in which, in a first phase, capacitors formed by the respective electrode 17 and the measurement membrane 5 are discharged, and the associated reference capacitors K1, K2 are charged with a defined reference charge. During the discharge of the pressure-dependent capacitors formed by the respective electrode 17 and the measurement membrane 5, the second switches S2 are closed, and the third switches S3 are open. During the charging of the reference capacitors K1, K2, the first switches S1 are closed, and the third switches S3 are open, so that the charge voltage $U_L$ is respectively applied to the first side of the reference capacitors K1, K2, and the signal voltage $U_{S1}$, $U_{S2}$ is respectively applied to the second side of the reference capacitors K1, K2. Following this, a charge transfer takes place in which the reference charges are transferred to the capacitors formed by the respective electrode 17 and the measurement membrane 5, and connected with the respective reference capacitor K1, K2. During this phase of the measurement cycles, the first and second switches S1, S2 are open and the third switch S3 is closed, such that the reference charges drain across the connection—existing due to the closed third switch S3—between the first sides of the reference capacitors K1, K2 to the respective electrode 17. Due to the charge transfer, an electrode potential E1, E2 respectively appears at the electrodes 17, which electrode potential E1, E2 corresponds to the ratio of the respective reference capacitance K1, K2 to the capacitance C1, C2 to be measured. The signal voltages $U_{S1}$, $U_{S2}$ available at the output of the buffer amplifiers OV1, OV2 are thus proportional to the reciprocal of the respective capacitance C1, C2 to be measured and are supplied to an electronic evaluation unit 31 connected at the output side to the buffer amplifiers OV1, OV2, which electronic evaluation unit 31 determines the pressure difference $\Delta p$ to be measured using the signal voltages $U_{S1}$, $U_{S2}$.

Such capacitance measurement circuits operating according to the principle of charge transfer offer the advantage that the generated signal voltages $U_{S1}$, $U_{S2}$ correspond to the electrode potentials E1, E2, and thus may be used directly as a shield potential, in that the buffer amplifiers OV1, OV2 are connected at the output side to the respective shield terminals 27. If necessary, for further amplification, the output signals of the buffer amplifiers OV1, OV2 may respectively be supplied to one of these additional downstream buffer amplifiers OV3, OV4, e.g., to an impedance converter, that then feeds at the output side to the respective shield terminal 27.

Alternatively, other capacitance measurement circuits known from the prior art may also be used. Insofar as the capacitance measurement circuits used comprise no sub-circuit that generates a signal corresponding to the respective electrode potential E1, E2, additional circuits are provided to generate the shield potentials. For example, suitable for this are buffer amplifiers to be connected at the input side to the respective electrode terminal 25, e.g., impedance converters that are connected at the output side to the respective shield terminal 27.

In that the layers 13 facing away from the membrane, and preferably also the edge regions 19 of the base bodies 1, 3, are held at the shield potential UE1, UE2 corresponding to the respective electrode potential E1, E2, charge shifts within these regions of the pressure sensor—which charge shifts are to be ascribed to the parasitic capacitive coupling between the respective electrode 17 and the layer 13 facing away from the membrane that belongs to the same base body 1, 3, as well as the parasitic capacitive coupling between the respective electrode 17 and the edge region 19 of each base body 1, 3, the edge region 19 belonging to the same base body 1, 3—are avoided. That offers the advantage that the measurement signals to be received via the electrode terminals 25 are protected against charge shifts that are not dependent upon the pressure to be measured, but that nevertheless alter the measurement signals. The measurement accuracy that can be achieved with the pressure sensors according to the invention is thereby improved.

Moreover, the application of the shield potential $U_{E1}$, $U_{E2}$ also has precisely the same effect as in the aforementioned prior art: a shielding of the respective electrode 17 from the external environment of the pressure sensor. The pressure sensor is thus thereby protected, both from interference signals acting upon it from the outside, and from capacitive couplings dependent upon the integration of the pressure sensor at a usage location, e.g., between the electrodes 17 and a metallic housing surrounding the pressure sensor.

Figure 6:
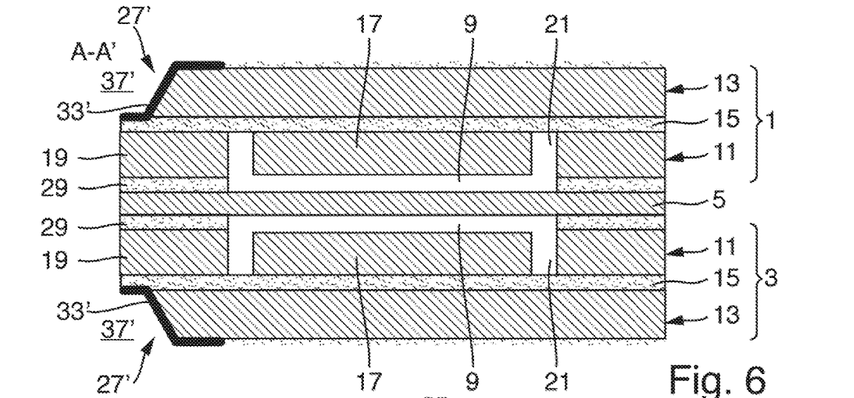
FIGS. 6-8 show sectional drawings of an alternative embodiment of the pressure sensor of FIG. 1.
Figure 7:
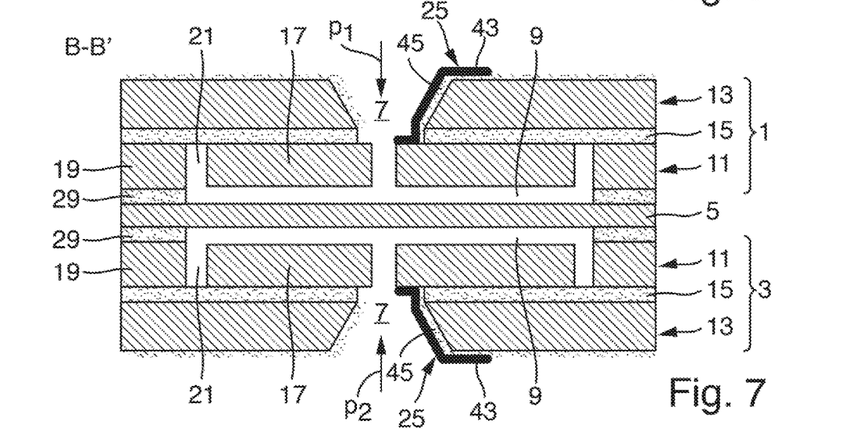
Figure 8:
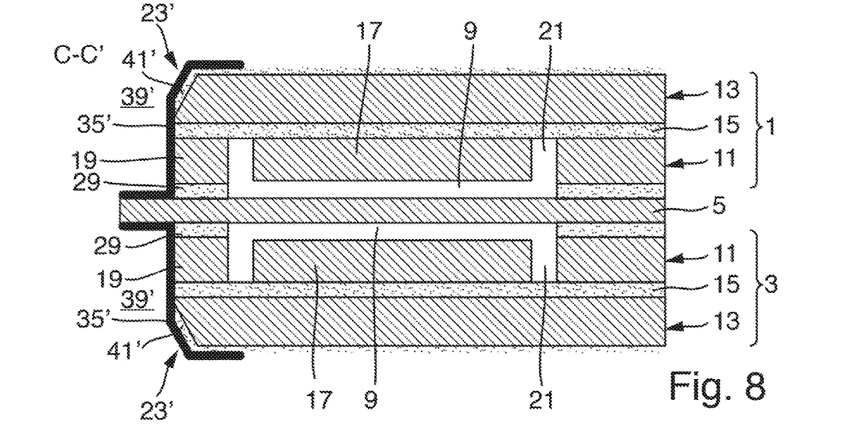

FIGS. 6 through 8 show an alternative embodiment of a pressure sensor—here likewise designed as a differential pressure sensor. It differs from the differential pressure sensor depicted in FIGS. 2-4 in that the edge regions 19 of the base bodies 1, 3 having an electrode 17 are not kept at the associated shield potential $U_{E1}$, $U_{E2}$, but rather at the reference potential $U_0$ applied to the measurement membrane 5. For this, the shield terminals 27' of the differential pressure sensor depicted in FIGS. 6-8 are shortened accordingly, so that only the layers 13 facing away from the membrane are in an electrically conductive connection with the respective shield terminal 27'. In contrast to the exemplary embodiment described in the preceding, here, each of the two base bodies 1, 3 is to be equipped with a membrane terminal 23' that, electrically insulated from the respective layer 13 facing away from the membrane, extends across the respective edge region 19 to the measurement membrane 5, and is in an electrically conductive connection with the respective edge region 19 and the measurement membrane 5. As an alternative to this, the outer edge regions 19 may naturally also respectively make contact here via separate terminals connected therewith in an electrically conductive manner, and be kept at the reference potential $U_0$, or one of the edge regions 19 may be contacted in the manner shown in FIG. 8 via the membrane terminal 23', whereas the other is contacted via a separate terminal and held at the reference potential $U_0$. Apart from the cited differences, the differential pressure sensor depicted in FIGS. 6 through 8 coincides with the exemplary embodiment depicted in FIGS. 2 through 4, such that the above description is inasmuch referenced in this regard. Since the edge regions 19 in these embodiments are kept at the same reference potential $U_0$ as the measurement membrane 5, an insulation of the measurement membrane 5 from the edge regions 19 via the insulation layer 29 is not required. However, as shown here, it may be used to achieve the separations between the measurement membrane 5 and the two electrodes 17. Alternatively, the insulation layers 29 naturally may also be omitted, and the separations between the measurement membrane 5 and two electrodes 17 may be produced otherwise—for example, in that edge regions directly connected with the measurement membrane 5 are used that exhibit a structural height that is greater than that of the electrodes.

The invention is not limited to the differential pressure sensors described here, but, rather, may be used entirely analogously in connection with modifications of the embodiments of the pressure sensors depicted here. As an example, differential pressure sensors are cited that differ from the exemplary embodiments depicted here in that only one of the two base bodies has an electrode, or in that at least one of the two base bodies has two or more electrodes. An additional example is that of relative pressure sensors that have only one base body, on which the measurement membrane is arranged with inclusion of a pressure chamber. In such case, the second base body 3 provided in the described differential pressure sensors is omitted. In measurement operation, the outside of the measurement membrane 5 is then charged with the pressure p to be measured, while a reference pressure fed to the pressure chamber 9 via the recess 7 in the first base body 1 is applied to its inside. Naturally, absolute pressure sensors may also be constructed entirely analogous to these relative pressure sensors, in that the pressure chamber 9 of the described relative pressure sensors is evacuated. In absolute pressure sensors as well, the electrode 15 integrated into the base body 1 is preferably contacted through the layer of the base body that faces away from the membrane, wherein the evaluated pressure chamber is sealed by the electrode 15 relative to the corresponding recess in the layer 13 facing away from the membrane.

The membrane terminals 23, 23' and the shield terminals 27, 27' of the pressure sensors according to the invention preferably respectively have a shield terminal or membrane terminal line 33, 35, 33', 35' that are applied onto generated surfaces of recesses 37, 39, 37', 39' provided at the corresponding locations in the respective base body 1, 3.

In the exemplary embodiment depicted in FIGS. 2 through 4, for this, the base bodies 1, 3 respectively have a first recess 37 provided on the edge of the respective base body 1, 3, which recess 37 leads through the respective layer 13 facing away from the membrane and the insulation layer 15 to the membrane-facing layer 11. For this, the shield terminals 27 respectively comprise a shield line 33 arranged on a generated surface of the respective recess 37, which shield line 33 lead from a region of the side of the edge region 19 facing away from the membrane, the region being uncovered by the recess 37, to a face side of the respective layer 13 facing away from the membrane, the face side facing away from the membrane. For example, the shield lines 33 are metallic coatings that are applied directly onto the corresponding generated surfaces of the recesses 37 and the face side of the respective layer 13 facing away from the membrane, the face side facing away from the membrane, where they are in electrically conductive contact with the respective layer 13 facing away from the membrane and the respective edge region 19.

Additionally, at least the first base body 1 has a second recess 39 provided at the edge of the first base body 1, which recess 39 extends through the respective layer 13 facing away from the membrane, the insulation layer 15, and the edge region 19 of the membrane-facing layer 11, to the measurement membrane 5. The membrane terminal 23 also comprises a terminal line 35 arranged on a generated surface of this recess 39, which terminal line 35 extends from a region of the measurement membrane 5 uncovered by the recess 39, along an outer surface of the edge region 19 and the layer 13 facing away from the membrane, up to a face side of the respective layer 13 facing away from the membrane, the face side facing away from the membrane. This terminal line 35 is in direct, electrically conductive contact with the measurement membrane 5, and is electrically insulated from the edge region 19 and the layer 13 facing away from the membrane by an insulation layer 41 arranged between the terminal line 35 and the outer surfaces of the edge region 19 and the layer 13 facing away from the membrane across which it extends.

The shield terminals 27' and the two membrane terminals 23' of the differential pressure sensor depicted in FIGS. 6-8 are designed according to the same basic principle. In contrast to the exemplary embodiment depicted in FIGS. 2-4, here, the recesses 37' that are provided for the shield terminals 27' at the edge of the base bodies 1, 3 extend into the base bodies 1, 3, but only up to the insulation layer 15 of the respective base body 1, 3, such that the shield terminals 27' here are electrically insulated by the insulation layers 15 from the edge region 19 of the respective base body 1, 3. Alternatively, in this embodiment, the shield terminals may also be shield terminal lines or also merely shield terminal contacts that only extend over a region of the face sides of the layers 13 facing away from the membrane, the face sides facing away from the membrane. In this instance, the recesses 37' are omitted.

In the pressure sensor depicted in FIGS. 6-8, the recesses 39' that are provided for the two membrane terminals 23' at the edge of the base bodies 1, 3 extend precisely as in the pressure sensor depicted in FIGS. 2-4, through the respective layer 13 facing away from the membrane, the insulation layer 15, and the edge region 19 of the membrane-facing layer 11, up to the measurement membrane 5 of the respective base body 1, 3. In contrast to the exemplary embodiment depicted in FIGS. 2-4, the membrane terminal lines 35' here are in direct, electrically conductive contact with the measurement membrane 5 and the respective edge region 19, and are electrically insulated from the respective layer 13 facing away from the membrane by an insulation layer 41' arranged between the terminal line 35' and the outer surface of the respective layer 13 facing away from the membrane across which it extends.

In both embodiments, the connection of the electrodes 17 also preferably takes place through corresponding recesses provided in the base bodies 1, 3. For this, the recesses 7 that are present anyway for the pressure charging of the pressure chambers 9 are preferably used. For this, these have a greater internal diameter in their region immediately adjoining the respective electrode 17, from the side facing away from the measurement membrane 5, than in their region leading through the respective electrode 17. A partial region of the side of the respective electrode 17 that faces away from the membrane is thereby freely accessible through the recess 7. Accordingly, the electrode terminals 25 respectively have an electrode terminal line 43 extending from the partial region of the respective electrode 17, said partial region being uncovered by the respective recess 7, up to a back side of the respective layer 13 facing away from the membrane, the back side facing away from the membrane, which electrode terminal line 43 is in direct, electrically conductive contact with the partial region and is electrically insulated from the layer 13 facing away from the membrane by an insulation layer 45 arranged between the electrode terminal line 43 and the generated surface of the layer 13 facing away from the membrane across which it extends.

Relative to a contact between the corresponding modules on the outer generated surface of the pressure sensor, the embodiment of the membrane terminals 23, 23' and of the shield terminals 27, 27' according to the invention has the advantage that they can be produced with high precision and cost-effectively using MEMS processes feasible in a wafer structure.

Figure 9:
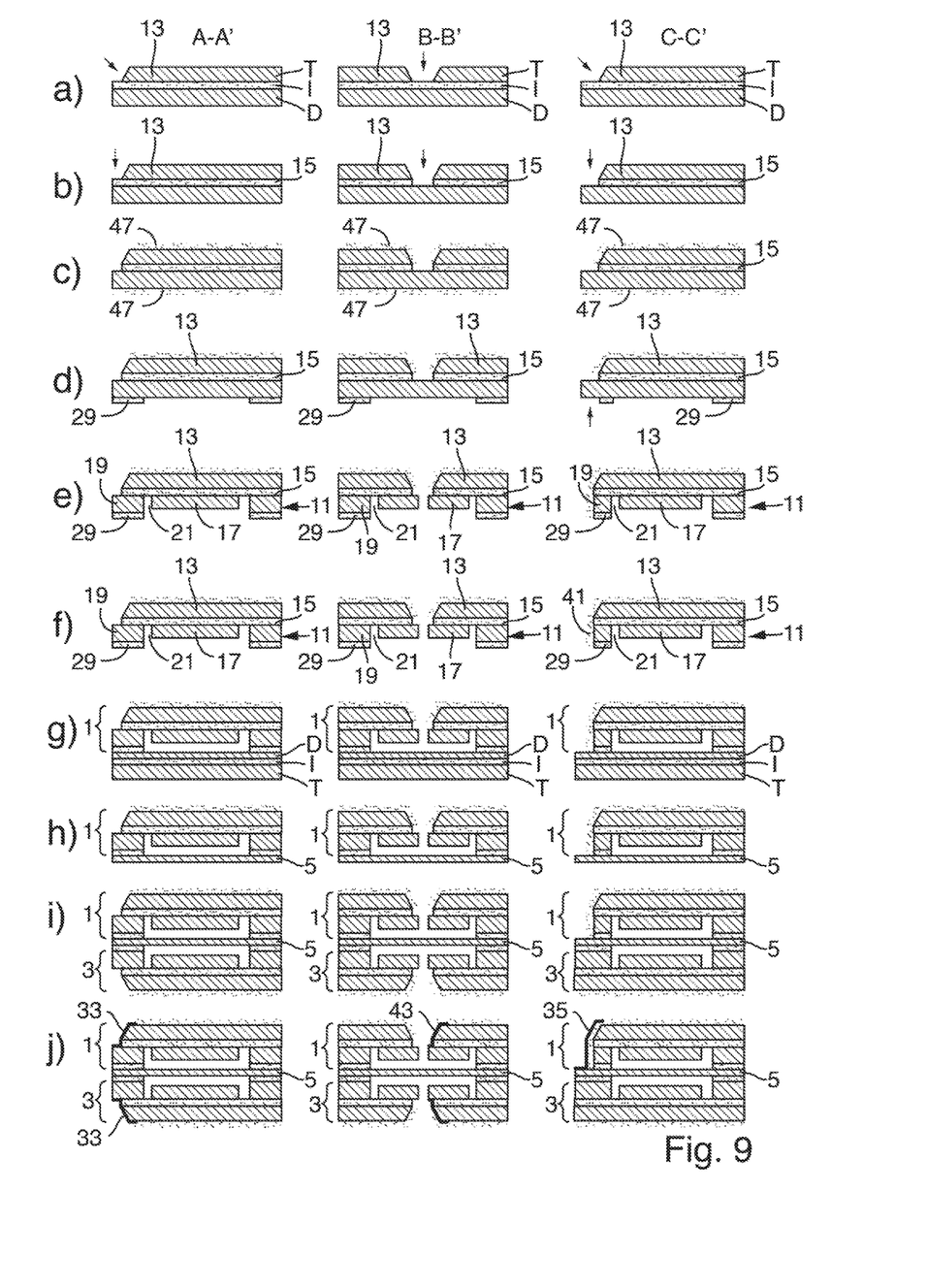
FIG. 9 shows method steps for the production of a pressure sensor according to FIGS. 1-4.

A corresponding method that is feasible in a wafer structure for the production of pressure sensors according to the invention is explained in the following in an example of the differential pressure sensor depicted in FIGS. 2-4. In this regard, FIG. 9 shows the individual intermediate products generated in method steps a)-j), respectively next to one another in the section planes A-A', B-B', C-C' indicated in FIG. 1. To produce the differential pressure sensors, 3 SOI wafers are used that respectively have an electrically conductive substrate layer T made of silicon, an insulation layer I of silicon oxide arranged thereon, and an electrically conductive cover layer D of silicon arranged on the insulation layer I.

Initially, first base bodies 1 are generated from a first SOI wafer in a wafer structure. The layers 13 facing away from the membrane are thereby produced from the substrate layer T of the wafer, the membrane-facing layers 11 are produced from its cover layer D, and the insulation layers 15 of the first base bodies 1 are produced from its insulation layer I.

In a first method step a), for this, reliefs (marked by arrows in FIG. 2) are generated in the substrate layer T at the positions provided for the electrode terminals 25, the membrane terminals 23, and the shield terminals 27, extending up to the insulation layer I of the wafer, which reliefs, in the respective base body 1, form the partial region of the recesses 7, 37, 39 necessary for the electrode terminals 25, the shield terminals 37, and the membrane terminals 23, said partial region traveling in the layer 13 facing away from the membrane. For this, pits forming the reliefs may be etched into the substrate layer T at the corresponding locations in an etching method, executed with potassium hydroxide (KOH), for example.

In the method step b) following this, those partial regions (marked again by arrows in FIG. 2) of the insulation layer I of the SOI wafer are removed that, in the first base bodies 1, form the partial regions of the recesses 7, 37, 39 required for the electrode terminals 25, the shield terminals 37, and the membrane terminals 23, the partial regions traveling through the insulation layer 15. For this, an etching method that is suitable for selective removal of silicon oxide is used—for example, reactive ion etching (RIE).

In the following method step c), on the top side and underside of the wafer, the surfaces required for the electrically conductive connections of the shield terminals 27 with the layers 13 facing away from the membrane and the edge regions 19 of the membrane-facing layers 11, and the surfaces required for the electrically conductive connection of the electrode terminals 25 with the electrodes 15, are provided under relief with an insulation layer 47. For example, for this, a wet oxidation method may be used, with which a silicon oxide layer is applied onto the corresponding surfaces.

In method step d), the insulation layer 47 applied onto the cover layer D is subsequently removed, except for the regions in the pressure sensors that later form the insulation layer 29 between the edge regions 19 of the membrane-facing layers 11 and the measurement membrane 5. At the same time, the regions of the insulation layer 47 are thereby removed that, in the pressure sensor, form the partial regions (highlighted by an arrow here) of the recesses 39 provided for the membrane terminal lines 23, the partial regions being located in the plane of the insulation layer 29. For example, this may take place by means of a dry etching.

Following this, in method step e), the membrane-facing layers 11 are structured in that the regions of the cover layer are removed that form the pits 21 between the electrodes 15 and the edge regions 19 of the membrane-facing layers 11, and that form the partial regions of the recesses 39 provided for the membrane terminals 23, the partial regions traveling through the membrane-facing layers 11. The latter are emphasized again by an arrow in FIG. 9 *d*). The removal of these regions takes place via deep reactive ion etching (DRIE).

Following this, in method step f), insulation layers are applied onto the generated surfaces of the membrane-facing layers 11 that adjoin the recesses 39 to be provided for the membrane terminals 23, which insulation layers—together with partial regions of the insulation layer 47 applied onto the substrate layer 13 in method step c)—form, in the finished pressure sensor, the insulation layer 41 between the membrane terminal lines 35 and the edge regions 19, and between the membrane terminal lines 35 and the layers 13 facing away from the membrane. For example, a dry oxidation method may be used for this.

In method step g), a second SOI wafer is subsequently joined with the first wafer processed according to method steps a)-f), such that the cover layer D of the second wafer rests on the additional insulation layers 29. In method step h), the substrate layer T and the insulation layer I of the second SOI are subsequently removed. Etching methods, e.g., deep reactive ion etching (DRIE), are suitable for removal of the substrate layer. Dry etching methods are suitable for removal of the insulation layer I, for example. The remaining cover layer D of the second wafer forms the measurement membranes 5 of the pressure sensors.

Parallel to the production of the first base bodies 1 from the first wafer according to method steps a)-f), the associated second base bodies 3 are produced from a third SOI wafer. Insofar as the second base bodies 3 should also have membrane terminals 23, the methods described using method steps a)-f) may be used for this. Insofar as the second base bodies 3 should have no membrane terminals 23, this method is to be modified insofar as the measures serving for the generation of the recesses 39 required for the membrane terminals 23, and of the insulation layer 41 required for the insulation of the membrane terminal lines 35 from the membrane-facing layers 11, are omitted.

As shown in method step i), the third SOI wafers processed in this way are subsequently joined, e.g., via direct silicon bonding (silicon fusion bonding), with the composite provided at the end of method step h), such that the additional insulation layers 29 that are applied onto the first and second base bodies 1, 3, and therefore also the electrodes 17, are respectively oppositely situated.

Finally, in method step j) the shield terminal lines 33, the membrane terminal lines 35, and the electrode terminal lines 43 are applied onto the corresponding generated surfaces of the recesses 33, 35, 7. This preferably occurs in that a metallic coating is applied, e.g., is sputtered, onto the corresponding generated surfaces. Finally, the differential pressure sensors produced in this manner are individualized by sawing along the outer generated surfaces of the individual differential pressure sensors.

The invention claimed is:

1. A pressure sensor, comprising:
a first base body, having two electrically conductive layers and an insulation layer arranged between said two electrically conductive layers and electrically insulating said two electrically conductive layers from one another;
an electrically conductive measurement membrane that is arranged on said first base body with inclusion of a pressure chamber and that can be charged with a pressure to be measured;
an electrode provided in a membrane-facing layer of said two electrically conductive layers and spaced apart from said electrically conductive measurement membrane, which electrode together with said electrically conductive measurement membrane forms a capacitor having a capacitance that varies as a function of the pressure acting upon said electrically conductive measurement membrane;
a measurement membrane terminal via which a reference potential can be applied to said electrically conductive measurement membrane;
an electrode terminal via which an electrode potential of said electrode can be tapped; and
a shield terminal via which a shield potential that can be predetermined independently of the reference potential, especially, a shield potential corresponding to the electrode potential, can be applied to a layer of said two electrically conductive layers facing away from said electrically conductive measurement membrane, wherein:
said membrane facing layer has an outer edge region connected with said measurement membrane and electrically insulated from said electrode;
an additional insulation layer that electrically insulates an edge region from said electrically conductive measurement membrane is provided between the edge region and said electrically conductive measurement membrane; and
said edge region is connected with said shield terminal via an electrically conductive connection.

2. The pressure sensor according to claim 1, wherein:
a circuit connected at the input side to said electrode terminal and at the output side to said shield terminal is provided, especially, a circuit having a buffer amplifier, especially, an impedance converter, which circuit in measurement operation:
taps the electrode potential via said electrode terminal connected to it at the input side;
generates a shield potential corresponding to the tapped electrode potential; and
applies the shield potential to said shield terminal connected to it at the output side.

3. The pressure sensor according to claim 1, wherein:
the reference potential is ground, or a reference potential of a circuit connected to said electrode terminal, especially, to said electrode terminal and said shield terminal.

4. The pressure sensor according to claim 1, wherein:
said membrane-facing layer has an outer edge region connected with said electrically conductive measurement membrane an electrically insulated from said electrode; and
said electrode terminal comprises an electrode terminal line that extends along a generated surface of a recess provided in said first base body, from a face side of the layer of said two electrically conductive layers facing away from said membrane, said face side facing away from said membrane up to said electrode, said electrode terminal line being electrically insulated from the layer of said two electrically conductive layers facing away from said membrane by an insulation layer arranged between said electrode terminal line and the layer of said two electrically conductive layers facing away from said membrane.

5. The pressure sensor according to claim 1, wherein:
said first base body has a first recess extending through the layer of said two electrically conductive layers facing away from said membrane and said insulation layer arranged between the layer facing away from the membrane and said membrane-facing layer of said two electrically conductive layers, up to said edge region of said membrane-facing layer of said two electrically conductive layers; and said shield terminal comprises a shield line that travels along a generated surface of said first recess and, there is an electrically conductive connection with said layer of said two electrically conductive layers facing away from said membrane and said edge region of said membrane-facing layer of said two electrically conductive layers, said first base body has a second recess extending through the layer of said two electrically conductive layers facing away from said membrane, said insulation layers, said edge region of said membrane-facing layer, and said additional insulation layer, up to said electrically conductive measurement membrane;

said membrane terminal comprises a membrane terminal line, that travels to said electrically conductive measurement membrane along a generated surface of said second recess, through said layer of said two electrically conductive layers facing away from said membrane, said insulation layer, and said edge region of the membrane-facing layer, that is electrically insulated, via an insulation layer arranged between said membrane terminal line and said generated surface, from said two electrically conductive layers facing away from the membrane and said edge region of said membrane-facing layer of said two electrically conductive layers, and that is an electrically conductive contact with a region of said electrically conductive measurement membrane that is accessible through said second recess.

6. The pressure sensor according to claim 1, wherein:

a second base body, connected with said measurement membrane with inclusion of a pressure chamber, is provided on a side of said measurement membrane opposite said first base body;

a first side measurement membrane can be charged with a first pressure via a recess in said first base body that opens into said pressure chamber of said first base body, and a second side of said measurement membrane can be charged with a second pressure via said recess in said second base body that opens into the pressure chamber of said second base body; and said second base body has:

two electrically conductive layers and an insulation layer arranged between its two layers and insulating said two layers from one another;

an electrode provided in the membrane-facing layer and spaced apart from the measurement membrane, which electrode together with the measurement membrane forms a capacitor having a capacitance that varies as a function of the pressure ($\Delta p$) acting upon the measurement membrane;

an electrode terminal via which an electrode potential at which its electrode lies can be tapped; and a shield terminal via which a shield potential especially, a shield potential corresponding to the electrode potential of its electrode can be applied to the layer facing away from the membrane.

7. The pressure sensor according to claim 6, wherein:

said membrane-facing layer of said second base body has an outer edge region connected with said electrically conductive measurement membrane and electrically insulated from said electrode;

that is electrically insulated from said electrically conductive measurement membrane, and is connected with said shield terminal of said second base body via an electrically conductive connection; or that is connected, via an electrically conductive connection, with a membrane terminal traveling across said second base body.

8. A pressure sensor, comprising:

a first base body, having two electrically conductive layers and an insulation layer arranged between said two electrically conductive layers and electrically insulating said two electrically conductive layers from one another;

an electrically conductive measurement membrane that is arranged on said first base body with inclusion of a pressure chamber and that can be charged with a pressure to be measured;

an electrode provided in a membrane-facing layer of said two electrically conductive layers and spaced apart from said electrically conductive measurement membrane, which electrode together with said electrically conductive measurement membrane forms a capacitor having a capacitance that varies as a function of the pressure acting upon said electrically conductive measurement membrane;

a measurement membrane terminal via which a reference potential can be applied to said electrically conductive measurement membrane;

an electrode terminal via which an electrode potential of said electrode can be tapped; and a shield terminal via which a shield potential that can be predetermined independently of the reference potential, especially, a shield potential corresponding to the electrode potential, can be applied to a layer of said two electrically conductive layers facing away from said electrically conductive measurement membrane, wherein:

said membrane facing layer has an outer edge region connected with said electrically conductive measurement membrane and electrically insulated from said electrode; and said edge region is connected with said membrane terminal via an electrically conductive connection.

9. The pressure sensor according to claim 8, wherein:

said shield terminal comprises a shield line that extends across a generated surface of said layer of said two electrically conductive layers facing away from said membrane;

the generated surface comprises, in particular, a generated surface of a first recess provided in said first base body, which leads from a face side facing away from said membrane into said first base body and, at maximum, extends up to said insulation layer;

said edge region is connected with said electrically conductive measurement membrane, electrically insulated from said electrically conductive measurement membrane via an additional insulation layer;

said first base body has a second recess extending from the face side of said first base body, said face side facing away from said membrane, through said layer of said two electrically conductive layers facing away from said membrane, said insulation layer, said edge region of said membrane-facing layer of said two electrically conductive layers, and the additional insulation layer, up to said electrically conductive measurement membrane; and said membrane terminal comprises a membrane terminal line that travels to said electrically conductive measurement membrane along a generated surface of said second recess, through the layer of said two electrically conductive layers facing away from said membrane, said insulation layer, and said edge region of the membrane-facing layer, that is electrically insulated, via an insulation layer arranged between said membrane terminal line and the generated surface, from the layer of said two electrically conductive layers facing away from the membrane, and that is in electrically conductive contact with said edge region of said membrane-facing layer and with a region of said measurement membrane that is accessible through said recess.

10. A pressure sensor, comprising:
- a first base body, having two electrically conductive layers and an insulation layer arranged between said two electrically conductive layers and electrically insulating said two electrically conductive layers from one another;
- an electrically conductive measurement membrane that is arranged on said first base body with inclusion of a pressure chamber and that can be charged with a pressure to be measured;
- an electrode provided in a membrane-facing layer of said two electrically conductive layers and spaced apart from said electrically conductive measurement membrane, which electrode together with said electrically conductive measurement membrane forms a capacitor having a capacitance that varies as a function of the pressure acting upon said electrically conductive measurement membrane;
- a measurement membrane terminal via which a reference potential can be applied to said electrically conductive measurement membrane;
- an electrode terminal via which an electrode potential of said electrode can be tapped; and
- a shield terminal via which a shield potential that can be predetermined independently of the reference potential, especially, a shield potential corresponding to the electrode potential, can be applied to a layer of said two electrically conductive layers facing away from said electrically conductive measurement membrane, wherein:
- said measurement membrane terminal comprises a membrane terminal line that extends along a generated surface of a recess provided in said first base body, especially of a recess provided at an edge of said first base body, from a face side of the layer of said two electrically conductive layers facing away from the membrane, said face side facing away from the membrane up to said electrically conductive measurement membrane, said membrane terminal line being in electrically conductive connection with said electrically conductive measurement membrane; and
- said shield terminal has a shield terminal line, especially a shield terminal line extending across a generated surface of a recess provided first in said base body, said shield terminal line being in electrically conductive connection with the layer facing away from said membrane.

* * * * *